(12) United States Patent
Patel

(10) Patent No.: US 7,571,937 B2
(45) Date of Patent: Aug. 11, 2009

(54) FLUID COUPLING ASSEMBLY WITH INTEGRAL RETENTION MECHANISM

(75) Inventor: Nilesh C. Patel, Irvine, CA (US)

(73) Assignee: SPS Technologies, LLC, Jenkintown, PA (US)

( * ) Notice: Subject to any disclaimer, the term of this patent is extended or adjusted under 35 U.S.C. 154(b) by 123 days.

(21) Appl. No.: 10/590,515

(22) PCT Filed: Aug. 23, 2005

(86) PCT No.: PCT/US2005/029870

§ 371 (c)(1),
(2), (4) Date: May 10, 2007

(87) PCT Pub. No.: WO2006/031386

PCT Pub. Date: Mar. 23, 2006

(65) Prior Publication Data

US 2007/0267869 A1 Nov. 22, 2007

(51) Int. Cl.
*F16L 55/00* (2006.01)

(52) U.S. Cl. .......................................... 285/92; 285/386

(58) Field of Classification Search ................... 285/92, 285/386, 246, 89
See application file for complete search history.

(56) References Cited

U.S. PATENT DOCUMENTS

| | | | |
|---|---|---|---|
| 408,320 A | 8/1889 | Powell | |
| 1,069,916 A | 8/1913 | Windsor | |
| 1,691,851 A | * 11/1928 | McCuean | ................... 285/386 |
| 1,914,736 A | 6/1933 | Coutu | |
| 2,400,338 A | 5/1946 | Cadman | |
| 2,491,406 A | 12/1949 | Zeeb | |
| 2,992,018 A | 7/1961 | Rosan | |
| 3,053,357 A | 9/1962 | Stanger | |
| 3,167,105 A | 1/1965 | Rosan | |
| 3,343,852 A | 9/1967 | Blight et al. | |
| 3,395,934 A | 8/1968 | Rosan et al. | |
| 3,702,707 A | 11/1972 | Rosan, Sr. | |
| 3,786,396 A | 1/1974 | Kemmer et al. | |
| 3,807,774 A | 4/1974 | Heath, Jr. | |
| 3,971,614 A | 7/1976 | Paoli et al. | |
| 4,063,756 A | 12/1977 | Anderson | |
| 4,152,039 A | 5/1979 | Shah | |
| 4,239,314 A | 12/1980 | Anderson et al. | |
| 4,452,473 A | 6/1984 | Ruschke | |
| 4,552,427 A | 11/1985 | Landgreen | |
| 4,617,118 A | 10/1986 | Smart | |
| 4,655,482 A | 4/1987 | Myers et al. | |

(Continued)

FOREIGN PATENT DOCUMENTS

GB 878824 10/1961

*Primary Examiner*—Aaron M Dunwoody

(57) ABSTRACT

The fluid coupling assembly for retaining a sealed joint includes the first member adapted to be connected to a first fluid conduit with a per sealing surface and a series of axially aligned serrations along with helical threads. A second member of a complementary configuration is adapted to be connected to a second fluid conduit with complementary threads and an axially extending cylindrical collar with spaced axial notches forming cantilevered beams. Each of the cantilevered beams can have teeth capable of engaging a series of serrations to provide an appropriate resistant force for both sealing engagement and disengagement. The teeth and serrations can remain in contact to provide a visual determination of a pre-torqued force between the first member and the second member.

20 Claims, 5 Drawing Sheets

U.S. PATENT DOCUMENTS

| | | |
|---|---|---|
| 4,834,667 A | 5/1989 | Fowler et al. |
| 4,877,271 A | 10/1989 | McCorkle et al. |
| 4,940,260 A | 7/1990 | Uriarte Odriozola |
| 5,058,930 A | 10/1991 | Schlosser |
| 5,083,819 A | 1/1992 | Bynum |
| 5,094,491 A | 3/1992 | Berghammer et al. |
| 5,131,690 A * | 7/1992 | Mano .......................... 285/92 |
| 5,188,398 A | 2/1993 | Parimore, Jr. et al. |
| 5,215,336 A | 6/1993 | Worthing |
| 5,350,200 A * | 9/1994 | Peterson et al. ............... 285/92 |
| 5,362,110 A | 11/1994 | Bynum |
| 5,388,866 A | 2/1995 | Schlosser |
| 5,496,189 A | 3/1996 | Over et al. |
| 5,586,790 A | 12/1996 | Bynum |
| 5,871,239 A | 2/1999 | Boscaljon et al. |
| 5,882,044 A | 3/1999 | Sloane et al. |
| 6,135,800 A | 10/2000 | Majors |
| 6,557,900 B1 | 5/2003 | Austin |
| 2006/0151994 A1 * | 7/2006 | Marc et al. .................... 285/92 |
| 2007/0164566 A1 * | 7/2007 | Patel .......................... 285/386 |

* cited by examiner

United States Patent US 7,571,937 B2

FLUID COUPLING ASSEMBLY WITH INTEGRAL RETENTION MECHANISM

BACKGROUND OF THE INVENTION

1. Field of the Invention

The present invention is directed to a coupling joint assembly for retaining a sealed joint by fastening two components together and more particularly to an improved fluid coupling assembly that can be scaled to maintain its pre-lube characteristics for different size fluid paths.

2. Description of Related Art

The necessity to couple and uncouple fluid lines or conduits, for example, associated with aircraft engines has been recognized in the prior art. Such coupling assemblies require a high degree of reliability to maintain a mechanical coupling of two component parts during use while subject to a substantial application of temperature ranges, stress vibration and movement. These factors can cause both a loosening and releasing of a desired seal ceding torque between a pair of interfacing components. In general, coupling two component parts together has frequently utilized the respective threads in a nut and bolt arrangement with the threads pre-loaded or torqued to a desired compression. To prevent a subsequent loosening of such a coupling joint, lock washers, interference thread fitting, tapered threading surfaces for providing interference, nut plates and lockwiring have been used.

In the aircraft field wherein the fluid coupling assembly is utilized in pneumatic and hydraulic connectors, there is not only temperature, external vibrations and stress problems, but also pressure stresses from the fluid that is being conducted through the sealed joint which can add additional problems.

Because of the necessity to maintain a high degree of reliability, frequently lockwiring has been utilized so that visual inspection can affirm the integrity of the coupling joint assembly. An example of a lockwire fluid coupling can be found in U.S. Pat. No. 3,702,707 and an alternative hydraulic connector can be seen in U.S. Pat. No. 4,877,271.

U.S. Pat. No. 5,215,336 discloses a coupling joint assembly wherein one or more annular cantilevered projections can engage an annular serrated surface to enable a sealing prelubed force to be created during a sealing engagement and to provide a locking interaction during any disengagement.

U.S. Pat. No. 5,058,930 discloses a high pressure coupling with an anti-galling feature wherein a ramp with an annular groove engages a coupling member that rides up the ramp until protruding tips extend beyond the ramp and are accommodated in the annular groove.

U.S. Pat. No. 6,557,900 discloses a multi-component nut locking apparatus also with an annular cantilevered pawl for engaging racket teeth. The release mechanism can engage the pawl to facilitate decoupling of the parts.

Finally, U.S. Pat. No. 3,053,357 discloses of interest a captive nut with a bolt guiding means.

There is still a need in the prior art such as in the aircraft field to provide a pair of lightweight fastening components that can form a locking assembly for a coupling joint with high reliability.

SUMMARY OF THE INVENTION

The present invention is directed to an improved fluid coupling assembly for retaining a sealed joint by fastening two components together. One of the components includes a serrated annular surface. The other component has an axially aligned flexible projection to contact the serrated annular surface to enable a relatively low force rotation during a sealing engagement of a first sealing surface on the first component and a second sealing surface on the second component. A relatively higher force resistance is provided between the serrated annular surface and the axial flexible projection during a disengagement rotation to thereby ensure the security of the predetermined seating torque between the pair of components.

The axially projecting members such as a cantilevered beam or a plurality of cantilevered beams can employ at least one tooth of a configuration having one or more surfaces of an inclination or disposition relative to the serrated annular surface to permit a lower force camming rotation in a first direction, but creating a higher force locking engagement in a second rotational direction.

The respective components can be joined to fluid conduits and the coupling assembly can be connected to the respective ends of the fluid conduits to enable the creation of a predetermined compressive or torque force on a sealed joint. The first component is adapted to be connected to a first fluid conduit and to provide a first sealing surface with a series of annular serrations positioned at a predetermined offset locations axially along the first component member. The first component member can have a first fastening configuration such as helical threads.

A second component member is adapted to be connected to a second fluid conduit and can enable a second sealing surface to engage the first sealing surface of the first component member. A second fastening configuration such as complimentary threads can be provided on the second component member wherein a position of the respective threads forming the fastening configuration and the position of the second sealing surface can be axially predetermined to ensure the appropriate sealing compression or torque force.

The second component member can have an annular cylinder, axially extending with a plurality of distal slots cut therein, to provide a plurality of axially cantilevered beams. Each cantilevered beam has a curvilinear cross section relative to a longitudinal axis and supports at least one tooth of a configuration to engage the series of annular serrations on the first component member. A series of serrations can, for example, be teeth having a camming face on one side of each tooth and a relative locking face on the other side of the tooth.

The teeth on the axially cantilevered beams can have a complimentary sloping face on one side to facilitate a low force camming rotation during a sealing engagement. The other side of the teeth can be either the same sloping face or alternatively be set at a different angular relationship to provide a locking engagement at a relatively higher force resistance during any rotational disengagement.

The first component member can have an approximately cylindrical configuration with a central cylindrical axial bore extending through a male projection having external helical threads for rotation within a hollow opening of the second component member that has interior complimentary helical threads for providing a fastening between the two component parts. Adjacent to the annular serrations on the first component member can be a multi-flat facet surface forming in essence a nut configuration to assist in rotating the first component so that a first sealing surface on the male projection can engage a second sealing surface provided, for example, on a ferrule-tube fitting that can be welded to a fluid conduit.

The second component member which functions similar to a nut also can have a plurality of load bearing exterior facets to assist in the application of a tightening force and a cylindrical hollow collar. The size and location of slots extending parallel to the longitudinal axis and the axial bore in the collar determine the length and flex of the cantilevered beams. The resilient flex of the cantilevered beams are also a function of the thickness of the beam, and the type of material that the beam is constructed from such as titanium, stainless steel, etc. The number of slots determine the width of the arc of each beam. The wider the arc of the beam, the more force resistance can be applied.

The location of the distal end of the cantilevered beams and the annular serrated teeth can be respectively positioned so that when the two components are rotated together into a sealing engagement, an alignment of the teeth and the annular serrations will provide a visual representation that the compressive or pre-torqued forces between the respective sealing surfaces have been provided. Additionally, any disengagement movement will permit an operator to determine that compressive forces have been compromised.

In operation, a second component member is actually mounted over a compression tube such as a ferrule-tube fitting having a conical bearing surface. The compression tube is frequently attached by welding to a fluid conduit. The second component member can relatively rotate about the compression tube, while the other end of the compression tube is securely fastened to its fluid conduit. The first component member is axially moved relative to the second component member so that the male member is then inserted into the female opening of the second component member to initially engage the respective threads.

The rotation of the second component member starts the sealing engagement. Only if the threads are preliminarily engaged as the respective sealing surfaces of the first component member and the second component member come into contact and the flexible axial projections on the second component member come into contact with the series of serrations to create both a vibrating tactile and audible indicator for determining that a locking coaction is being engaged and completing the sealing joint. By appropriately determining the number of serrated teeth and the position of the axial projection members will ensure a retention action between the axial projection members and the serrated teeth.

In an alternative embodiment, a subjective balance force can be achieved in both coupling and de-coupling modes of operation. The teeth on the cantilevered beams and the annular serrated teeth can be uniformly rounded. By removing any bias structure or configurations on the contact surface of the annular serrations, the manufacturing cost can be lessened and foreign object debris and damage can be reduced. Also by rounding the contact surface on the annular serrations, less wear and tear is experienced on both component members.

The second component member can be utilized to determine the desired coupling force and de-coupling force by the degree of slope on the camming face on each cantilevered tooth and the degree of slope on the locking face on the other side of the tooth.

The cantilevered teeth can have a basic sinusoidal configuration to provide an initial rounded design configuration for the teeth with a 30° lead slope overlaid on the sinusoidal camming face and a 50° rear slope overlaid on the rear or locking face.

An increase of the number of teeth on each axially projecting member can further help distribute the pressure during contact and further reduce the possibility of foreign object debris and damage.

Finally, an axial chamfer of a gentle and smooth configuration can further facilitate a mating of the teeth and annular serrations during coupling.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the coupling industry to make and use the invention and sets forth the best modes contemplated by the inventory of carrying out his invention. Various modifications, however, remain readily apparent to those skilled in this field since the generic principles of the present invention have been defined herein specifically to provide a relatively easily manufactured locking assembly for fastening two components together such as a fluid coupling in the aircraft industry.

Figure 1:
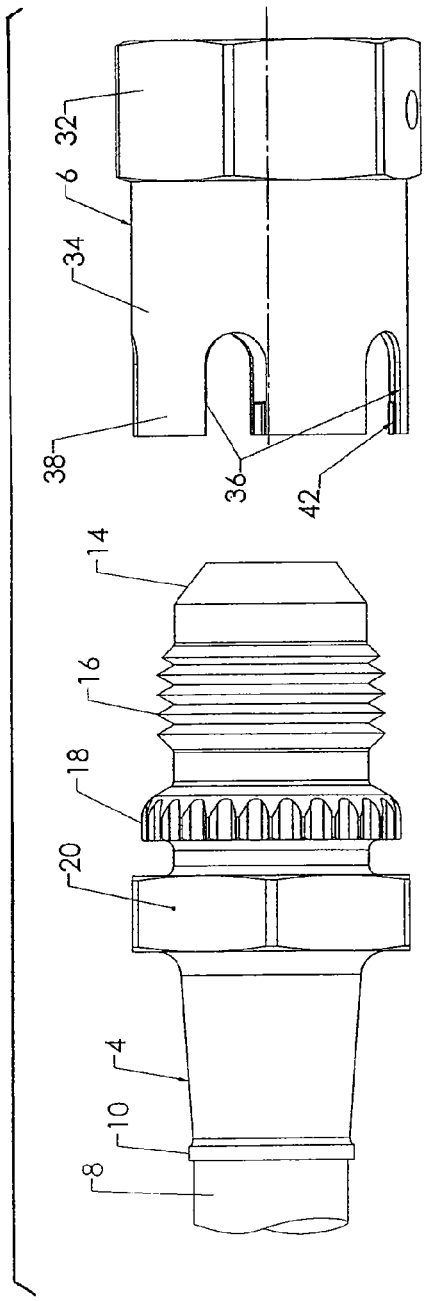
FIG. 1 is an elevated view of a coupling assembly in accordance with the present invention.
Figure 2:
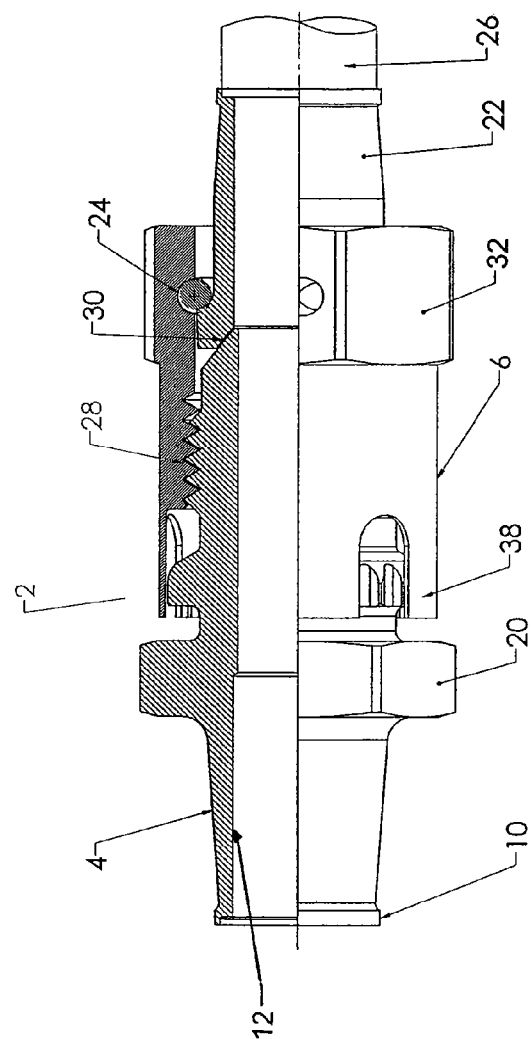
FIG. 2 is a partial cross-sectional view of the coupling assembly of FIG. 1 in a coupled mode.

Referring to FIGS. 1 and 2, a fluidic coupling assembly 2 of the present invention is disclosed and includes a first coupling member 4 and a second coupling member 6. The first coupling member 4 can be joined to a first fluid conduit 8. A flange 10 can be welded to the first fluid conduit 8. Other retention devices, however, could be utilized but in a relatively high pressure hydraulic system for an aircraft engine, welding may be preferable. As can be appreciated, the first coupling member 4 has an approximately cylindrical configuration with a hollow interior axial flow conduit 12. A bearing surface 14 is provided at the other end of the first coupling member 4. Adjacent to bearing surface 14 is a helical thread fastener 16. The helical thread fastener 16 terminates adjacent an annular series of serrations or detent teeth 18. The spacing of the serrations 18 along an axial length of the first coupling member 4 is specifically designed to ensure an initial engagement of the helical thread fastener 16 before the serrations 18 are engaged.

The polygonal set of planner facets 20 can be used to provide a surface for engagement with a wrench, etc. to stabilize the first coupling member 4 which forms the male member of the fluidic coupling assembly 2.

The second coupling member 6 or female component of the fluid coupling assembly 2 can be secured to a compression tube 22 therein by a thrust wire or ring 24. The compression tube 22 or ferrule tube fitting can be welded to a second fluid conduit 26. The compression tube or ferrule tube fitting 22 has a complementary sloping bearing surface 30 to receive the bearing surface 14 of the first coupling member 4.

Thus, the second coupling member 6 is connected to the second fluid conduit 26 and has complementary internal threads 28 for engaging the helical threaded fastener 16 on the male component 4 to force the respective bearing surfaces 14 on the first coupling member 4 against a complementary bearing surface 30 on the compression tube 22. Thus, the second coupling member 6 is rotably mounted around the compression tube 22 and has an external surface including a plurality of planner facets 32 of a polygonal shape that can receive a wrench or jaws of pliers for applying additional torquing forces.

A collar member 34 is integrally provided with plannar facets 32 and has axial cuts or notches 36 to define axially cantilevered beams 38. Each of the cantilevered beams 38 has a curvilinear cross-section and can be spaced in an annular pattern with one or more teeth provided at an axially distal side of each cantilevered beam. As is known in the art, the relative cross-sectional thickness of the cantilevered beams, the amount of arc, along with the particular material in which the second coupling member 6 is formed, will determine the amount of flex of each of the respective cantilevered beams 38. As can be appreciated, the coupling members can be made from titanium, stainless steel, and various alloys and even plastic in some embodiments, or any other material suitable and known within the coupling art. The selection of the material will depend upon the accuracy and forces to be handled by the coupling assembly 2.

Figure 3:
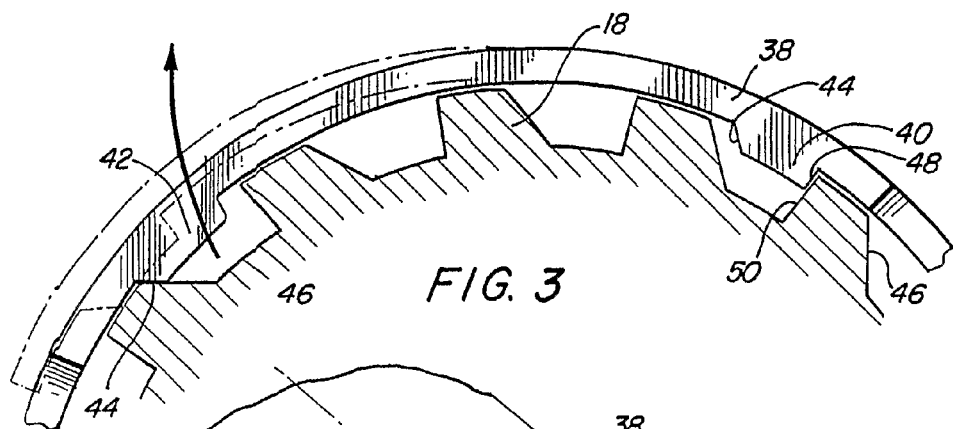
FIG. 3 is a schematic view disclosing one embodiment of an engagement relationship between the first member of the coupling assembly with the series of serrations and a second member with teeth extending from an axially cantilevered beam.

Referring to FIG. 3, a schematic cross-sectional view is disclosed of a first embodiment of the present invention, wherein the serrations or detents 18 are shown relative to a pair of spaced teeth 40 and 42 extending radially inward for engagement with the serrations 18. The serrations 18 are annularly arranged in a circular pattern about the exterior of the first coupling member 4, and the axial cantilevered beams 38 have inner and outer diameters that subscribe concentric circles with the respective teeth members 40 and 42 projecting radially inward from the distal ends of the cantilevered beam inner diameter to engage the circular serrations 18 in a ratchening manner as the respective teeth undulate over the circular serrations 18 during sealing engagement and disengagement modes of operation.

Figure 4:
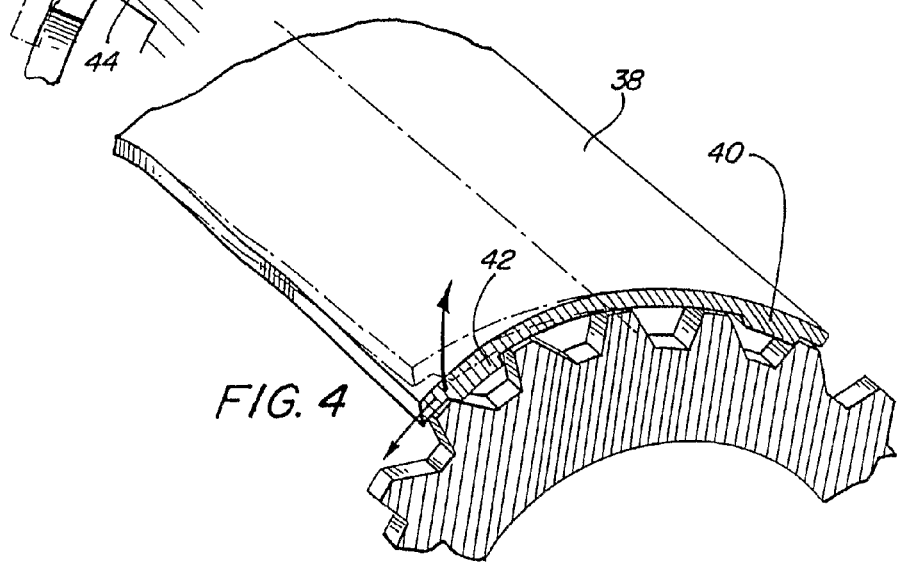
FIG. 4 is a schematic perspective view disclosing a coupling movement of the embodiment of FIG. 3.
Figure 5:
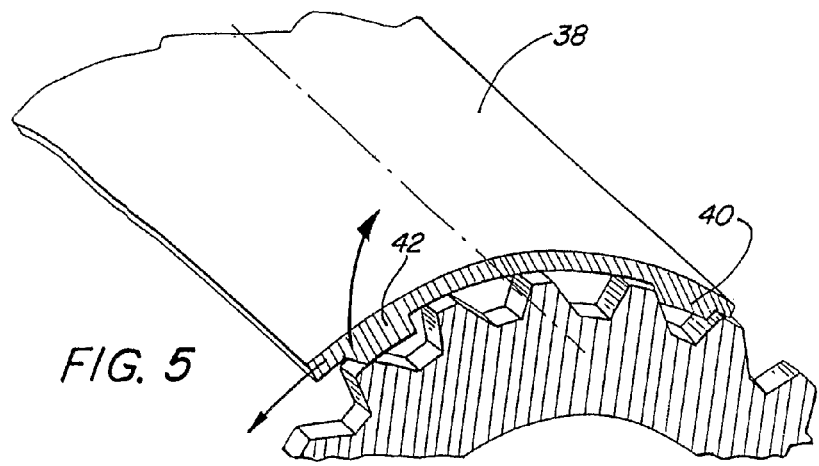
FIG. 5 is also a schematic perspective view disclosing a coupling movement further downstream of FIG. 4.

FIG. 4 is another perspective view disclosing the relative flex of a cantilevered beam 38 as a sloping camming surface 44 on tooth 42 engages the corresponding sloping surface 46 of the serrations. A counterclockwise movement or rotation provides a coupling action between the first coupling member 4 and the second coupling member 6. The rear surface 48 of the respective teeth 40 and 42 and the front surface 50 of the serrations have a steeper slope and create a locking torque to resist any unwanted de-coupling motion in the clockwise direction. By staggering the contact of the location of the first tooth 42 in the coupling direction and the second tooth 40, less force will be asserted since the cantilevered beam 38 can flex with corresponding less force to cause the flexing motion.

Figure 6:
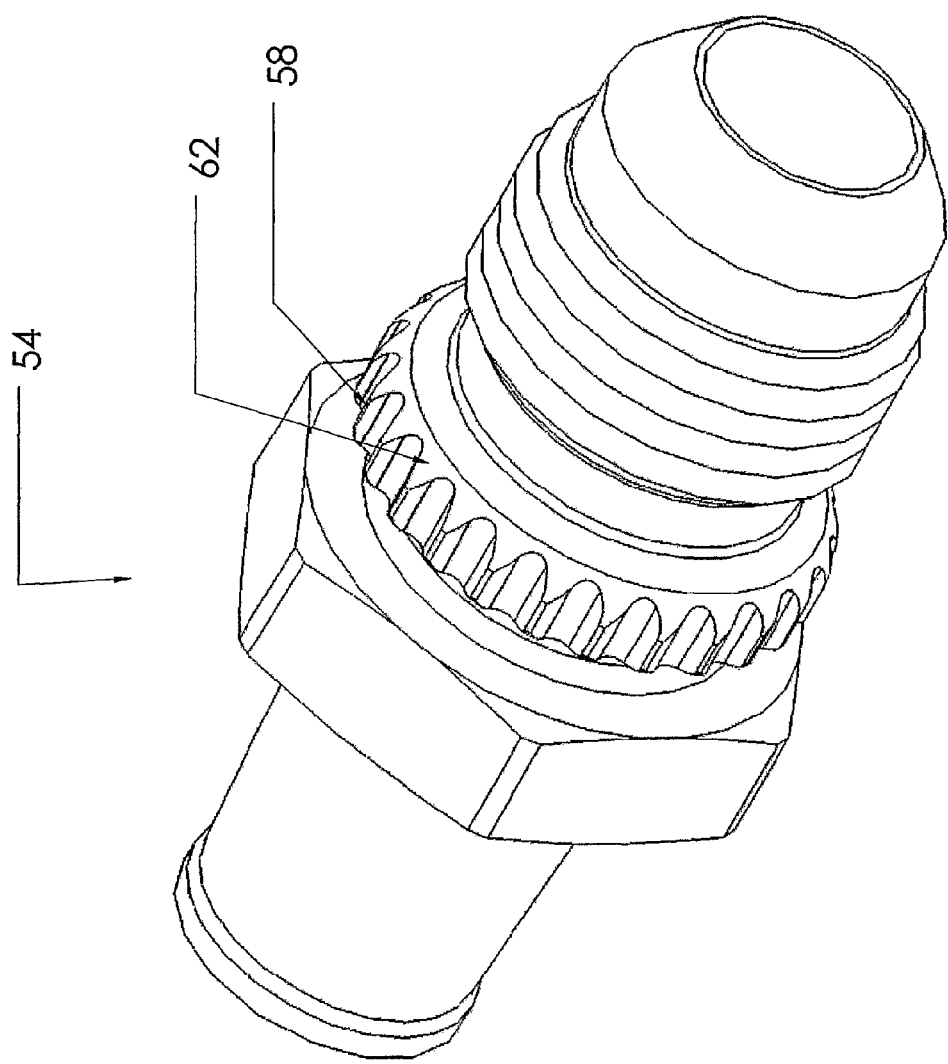
FIG. 6 is a perspective view of a first coupling member of the second embodiment.
Figure 7:
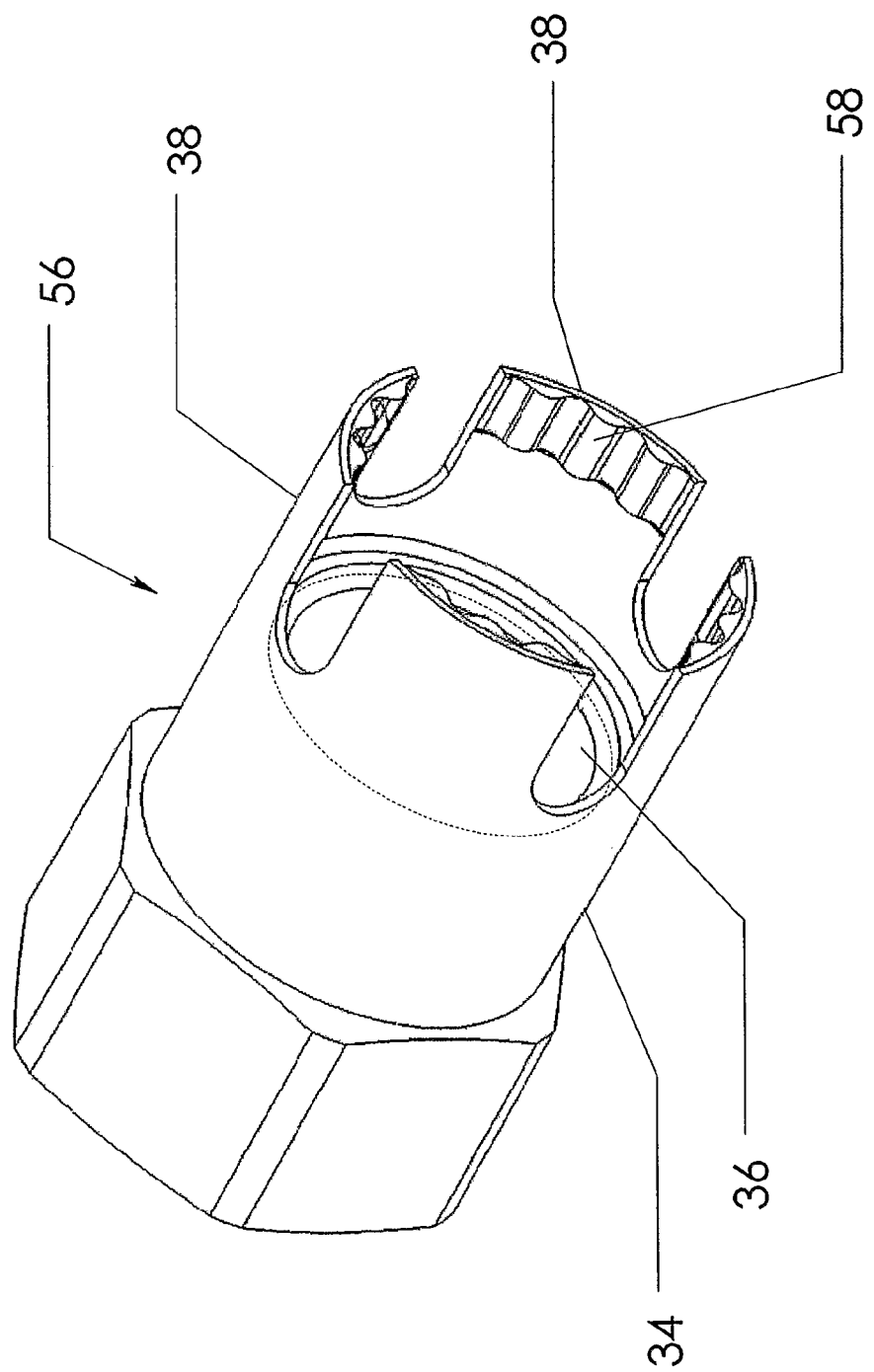
FIG. 7 is a perspective view of a second coupling member of the second embodiment.

Referring to FIG. 6, a second embodiment of the present invention is disclosed wherein a first coupling member 54 can engage with a second coupling member 56 shown in a perspective view in FIG. 7. The differences between the first embodiment and the second embodiment reside in the configuration of the serrations or detents 58 and the teeth 60 extending radially inward from the axially cantilevered beam 38. Since the other features are the same as the first embodiment, the same reference numbers will be utilized for those components.

Figure 8:
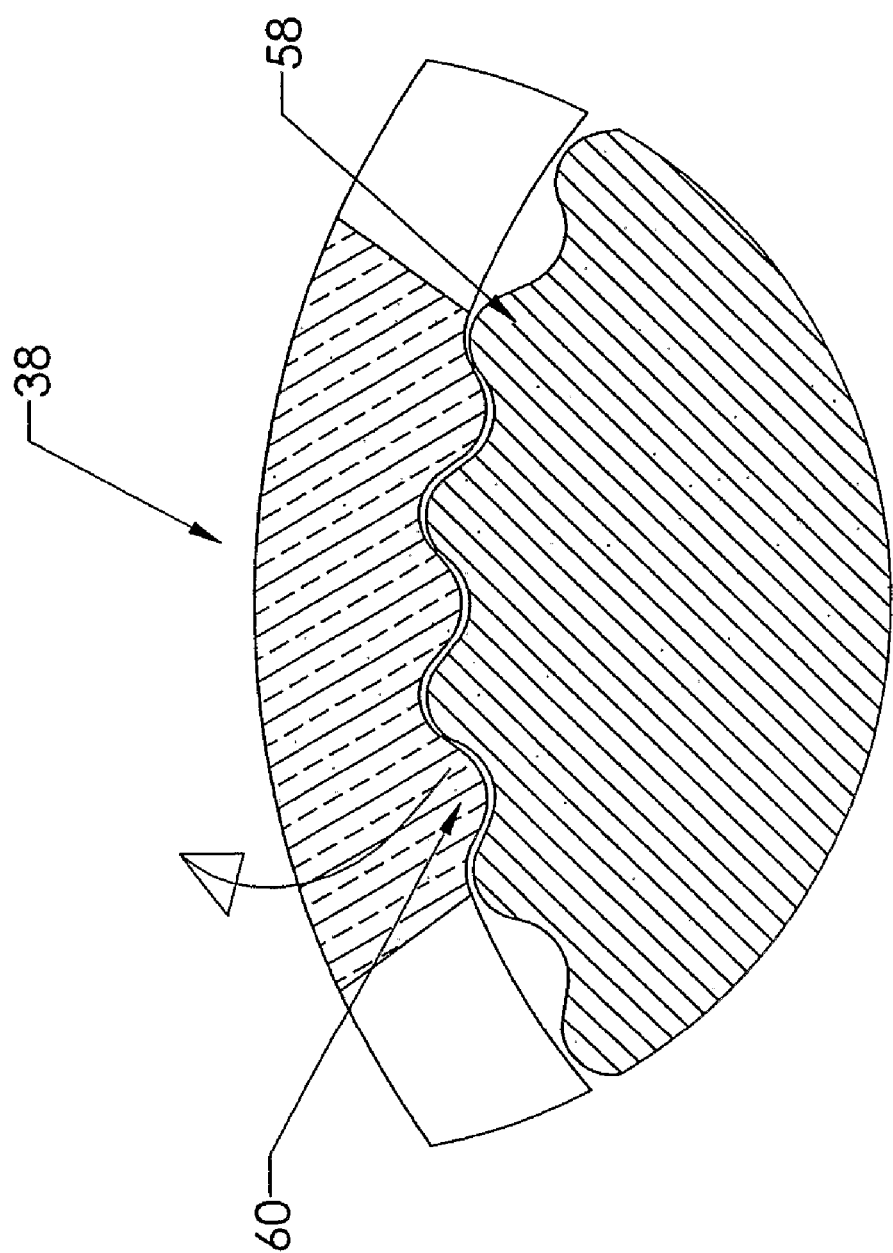
FIG. 8 is a schematic cross-sectional view of the engagement between the teeth on a cantilevered beam and the serrations.

FIG. 8 discloses a schematic cross-sectional view of the axially cantilevered beam 38, serrations 58 and plurality of teeth 60. In the second embodiment any differential force can be achieved in both coupling and de-coupling modes of operation by the slope of the teeth 18 forming the annular serration.

By manufacturing the cantilevered teeth on the second coupling member 56, so that the teeth are of a rounded or a sinusoidal configuration, the manufacturing costs are significantly lessened and foreign object debris and damage can be reduced. Thus, less wear and tear is experienced. Since the leading surface and the trailing surface of the teeth have the same slope any difference in the forces exerted during coupling and the forces exerted during de-coupling of the second embodiment will depend upon the first coupling member and the degree of slope on the initial camming face of each serration tooth and the degree of slope on the locking face on the other side of the teeth 58, the teeth 58 can have a basic sinusoidal configuration to provide an initial rounded design configuration that is then altered in manufacturing so the teeth, for example, can have a 30° lead slope overlaid on the sinusoidal camming face with a 50° rear slope overlaid on the rear or locking face. Alternatively, both the serration 58 and the cantilevered teeth 60 can have the same rounded configurations to provide a consistent resistance force that will be equal for both coupling and de-coupling.

An increase in the number of teeth, for example 3, as shown in FIG. 7, can further help distribute the pressure during contact, and further reduce the possibility of foreign object debris and damage. As can be seen in FIG. 6, the leading axial surface of the serration or detents 58 can be beveled or chamfered 62 to provide a gentle and smooth configuration to further facilitate a mating of the teeth 60 and the serrations 58 during the initial coupling.

As can be appreciated, the specific angle of the lead slope and the rear slope of the serration 58 can be subjectively determined to determine both the degree of forces experienced during coupling and the forces experienced during the de-coupling operation.

To provide an appreciation of the forces that may occur in the second embodiment, a titanium alloy per AMS 4928 with a length of the first coupling member or male member being approximately one and one-half inch in length and with a fluid conduit tube of 0.250 inches OD will experience an assembly torque of 65 to 75 pounds per inch. The second coupling member 56 will have an OD diameter of the collar member 34 of 0.530 inches and an axial length of 0.880 inches. The weight in pounds will be 0.039 when the coupling members are assembled together.

As can be appreciated, a lighter weight is highly desirable since a large number of fluidic connections are frequently found in an engine used in the aircraft industry. With a fluidic conduit tube OD of one inch and an assembly torque in pounds per inches of 950 to 1050, the axial length of the first coupling member can be approximately two inches while the second coupling member will have an OD diameter for the collar member 34 of one and one-half inches and an axial length of 1.440 inches.

The threads on the first coupling member 54 and the threads on the second coupling member 56 can be pursuant to Military Specification 8879.

When the male coupling member 4, 54 is inserted within the female aperture of the second coupling member 6, 56, the second coupling member is rotated to engage the respective helical threads 16 and 28. After these threads have been positively engaged and the first coupling member 4, 54 is actually drawn into the second coupling member 6, 56, the teeth on the collar member 34 begin to engage the series of serrations or detents 18. The serrated detents are aligned parallel to the longitudal axis of the coupling assembly and can have a different cross-sectional configuration as can be seen between the first embodiment and the second embodiment of the present invention. Since the teeth cantilevered from the collar 34, and more specifically from the axially cantilevered beams 38 are resiliently biased against the serrations 18 on the first coupling member, they provide a flexing action and a spring-loaded force to provide a pre-determined amount of resistance to the sealing rotation. The inner engagement of the teeth and the serrations can create both a tactile vibration that can be felt by the operator and an audio ratchet sounding interface that can be heard by the operator so that he or she is assured that a positive sealing and locking action is occurring even if it is not possible to see the coupling assembly. It is also possible to view the matching engagement of the teeth with the serrations to provide a visual determination of an adequate seal being accomplished. The sealed joint of the fluidic coupling assembly occurs when the respective bearing surfaces 14 and 30 are preloaded or pretorqued to the desired level.

A reverse rotation will cause the respective teeth to enter into a locking engagement with the reversed surfaces on the serrations.

As can be readily appreciated, there are no secondary actions required by the operator to ensure a positive retention feature for an operative coupling assembly. The retention feature is integrated directly with the primary sealing rotation of the second coupling member. Thus, the necessity of positioning additional lock rings or lock wires has been eliminated and an important safety feature is still established that can help minimize human error.

As can be readily appreciated, the fluidic coupling assembly of the present invention can be manufactured in a relatively economical manner to provide an advantageous fluidic and hydraulic connection where safety is the prime interest, for example on aircraft engines.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. A fluid coupling assembly for retaining a sealed joint, composing:
   a first member adapted to be connected to a first fluid conduit and having a first sealing surface, a radially projecting series of serrations and a first fastening configuration; and
   a second member adapted to be connected to a second fluid conduit, a second fastening configuration and enabling a second sealing surface to engage the first sealing surface,
   the second member has a plurality of annularly spaced axially cantilevered beams, each beam having at least one tooth of a configuration to engage the series of serrations, an operative engagement of the tooth and serrations enables a relative low force rotation during a sealing engagement of the first sealing surface and the second sealing surface and a relatively higher force resistance to rotation during disengagement the axially spaced cantilevered beams are spaced to position respective distal ends of the cantilevered beams to enable a visual conformation of engagement of an alignment of a tooth and the annular serrations between the spacing of the cantilevered beams.

2. The fluid coupling assembly of claim 1 wherein each cantilevered beam has a curvilinear cross section traverse to an axial direction.

3. The fluid coupling assembly of claim 2 wherein the cantilevered beams are spaced in an annular pattern with a pair of teeth provided at an axially distal side end of each cantilevered beam.

4. The fluid coupling assembly of claim 1 wherein the serrations are annularly arranged in a circular pattern about the first member and the axially cantilevered beams have inner and outer diameters that subscribe concentric circles and at least one tooth member on each cantilevered beam projects radially inward from each cantilevered beam inner diameter to engage the circular serrations in a ratcheting manner as the respective teeth undulate over the circular serrations during sealing engagement and disengagement modes of operation.

5. The fluid coupling assembly of claim 4 wherein a pair of spaced teeth project radially inward from each cantilevered beam.

6. The fluid coupling assembly of claim 4 wherein the circular serrations are formed by truncated teeth with annular axially tapered surfaces and transverse engagement surfaces of different angular dimensions.

7. The fluid coupling assembly of claim 4 wherein the cantilevered beam teeth and the circular serrations have the angular dimensions for the engagement surfaces wherein an equal resistance force is provided for both coupling and de-coupling.

8. The fluid coupling assembly of claim 7 wherein 3 spaced teeth project radially inward from each cantilevered beam.

9. The fluid coupling assembly of claim 1 wherein axial leading surfaces of the serration are chamfered.

10. The fluid coupling assembly of claim 1 wherein the location of the tooth and the serrations are to align at their axially leading transverse surfaces when the first member and second member are operatively coupled.

11. A fluid coupling assembly for retaining a sealed joint, composing:
    a first member adapted to be connected to a first fluid conduit and having a first sealing surface, a series of serrations and a first fastening configuration; and
    a second member adapted to be connected to a second fluid conduit, a second fastening configuration and enabling a second sealing surface to engage the first sealing surface,
    the second member has a plurality of axially cantilevered beams, each beam having a plurality of teeth of a configuration to engage the series of serrations and spaced offset from an axis of the first and second fluid conduit wherever the initial and final operative engaging contact of the teeth and serrations is directly between an entrance of the teeth into the serrations and axially aligned surfaces of the serrations, an operative engagement of the teeth and serrations enables a resistance force rotation during a sealing engagement of the first sealing surface and the second sealing surface and a resistance force rotation during disengagement, the plurality of teeth and serrations remaining in contact with each other when a pre-determined sealing force is reached between the first member and the second member.

12. The fluid coupling assembly of claim 11 wherein each cantilevered beam has a curvilinear cross section traverse to an axial direction.

13. The fluid coupling assembly of claim 12 wherein the cantilevered beams are spaced in an annular pattern with a plurality of teeth provided at an axially distal side end of each cantilevered beam.

14. The fluid coupling assembly of claim 13 wherein the serrations are annularly arranged in a circular pattern about the first member and the axially cantilevered beams have inner and outer diameters that subscribe concentric circles and each tooth member on each cantilevered beam projects radially inward from each cantilevered beam inner diameter to engage the circular serrations in a ratcheting manner as the respective teeth undulate over the circular serrations during sealing engagement and disengagement modes of operation.

15. The fluid coupling assembly of claim 14 wherein the resistance force is the same during the sealing engagement and sealing disengagement.

16. A fluid coupling assembly for retaining a sealed joint, comprising:
a first member adapted to be connected to a first fluid conduit and having a first sealing surface, a series of axially aligned raised serrations and a first fastening configuration; and
a second member adapted to be connected to a second fluid conduit, a second fastening configuration and enabling a second sealing surface to engage the first sealing surface,
the second member includes a hollow cylindrical collar with spaced axial notches forming a plurality of axially cantilevered beams, wherein each cantilevered beam has a curvilinear cross section traverse to an axial direction, each beam having a plurality of teeth of a configuration to engage the series of serrations, an operative engagement of the teeth and serrations enables a resistance force rotation during a sealing engagement of the first sealing surface and the second sealing surface and a resistance force rotation during disengagement, the plurality of teeth and serrations remaining in contact with each other when a pre-determined sealing force is reached between the first member and the second member.

17. The fluid coupling assembly of claim 16 wherein one of the serrations and teeth have transverse engagement surfaces of different angular dimensions during a sealing engagement and disengagement to provide a lower force during engagement and a higher force during engagement.

18. The fluid coupling of claim 16 wherein the axially aligned serrations are annularly arranged in a circular pattern about the first member and the axially cantilevered beams have inner and outer diameters that subscribe concentric circles and each tooth member on each cantilevered beam projects radially inward from each cantilevered beam inner diameter to engage the circular serrations in a ratcheting manner as the respective teeth undulate over the circular serrations during sealing engagement and disengagement modes of operation whereas the cylindrical collar contacts the first member only when the respective tooth members and circular serrations engage in an initial and final engaging contact directly between an entrance to the serrations and a surface of the axially aligned raised serrations.

19. An integral two piece fluid coupling assembly for retaining a sealed joint between a pair of fluid conduits comprising:
a first member having a central fluid passageway adapted to be connected to a first fluid conduit and having an integral first sealing surface at one end, an integral outwardly projecting series of serrations in a circular pattern, and an integral outwardly projecting first fastening configuration; and
a second member having a central fluid passageway adapted to be connected to a second fluid conduit, an integral second fastening configuration for enabling a second sealing surface to engage the first sealing surface, the second member has an integral outer cylindrical surface extending over the second fastening configuration with a plurality of spaced cantilevered beams integrally extending from the cylindrical surface and configured to operatively extend over the series of serrations when the first sealing surface engages the second sealing surfaces,
wherein each cantilevered beam has an inner and an outer diameter that subscribes concentric circles and a plurality of teeth of a configuration to engage the series of serrations and spaced offset from an axis of the first and second fluid conduit wherever the initial and final operative engaging contact of the teeth and the series of serrations is directly between an entrance of the teeth into the serrations and axially aligned surfaces of the series of serrations, and a visual confirmation of an engagement contact of the teeth and series of serrations is provided in the spacing between the cantilevered beams, while an audio and tactile confirmation of engagement contact of the teeth and the series of serrations is provided in the ratcheting manner as the plurality of teeth undulate over the circular pattern of the series of serrations during a sealing engagement and a disengagement mode of operation.

20. The integral two piece fluid coupling assembly of claim 19 wherein respective contact surfaces of the series of serration pattern and the plurality of teeth on each cantilevered beam enables a lower resistance force rotation during a sealing engagement of the first sealing surface and the second sealing surface and a higher resistance force rotation during disengagement, the plurality of teeth and the series of serrations remaining in contact with each other when a pre-determined sealing force is reached between the first member and the second member.

* * * * *